US012769749B2

(12) United States Patent
Tomioka et al.

(10) Patent No.: US 12,769,749 B2
(45) Date of Patent: Oct. 20, 2026

(54) INFORMATION PROCESSING APPARATUS, METHOD, AND STORAGE MEDIUM

(71) Applicant: CANON KABUSHIKI KAISHA, Tokyo (JP)

(72) Inventors: Makoto Tomioka, Kanagawa (JP); Kazuhiko Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 18/950,708

(22) Filed: Nov. 18, 2024

(65) Prior Publication Data

US 2025/0173352 A1 May 29, 2025

(30) Foreign Application Priority Data

Nov. 28, 2023 (JP) ................................ 2023-200462

(51) Int. Cl.
*G06F 7/00* (2006.01)
*G06F 16/2458* (2019.01)

(52) U.S. Cl.
CPC ................................ *G06F 16/2458* (2019.01)

(58) Field of Classification Search
CPC .................................................. G06F 16/2458
See application file for complete search history.

(56) References Cited

U.S. PATENT DOCUMENTS 5,554,983 A * 9/1996 Kitamura ................ G08G 1/04 382/209
8,745,090 B2 * 6/2014 Caduff ................ G06F 3/04842 707/791
8,786,700 B2 7/2014 Kobayashi
8,792,726 B2 7/2014 Watanabe
9,275,461 B2 3/2016 Watanabe
9,841,271 B2 12/2017 Nakazato
10,192,415 B2 * 1/2019 Heitz, III ......... G08B 13/19656
10,205,637 B2 * 2/2019 Porras ..................... H04L 41/40
10,489,103 B1 * 11/2019 Gruebele .............. G06F 1/3275
11,842,511 B2 12/2023 Sato
2013/0103624 A1 * 4/2013 Thieberger ............. G06N 20/00 706/12

(Continued)

FOREIGN PATENT DOCUMENTS

JP 7111422 B2 8/2022
JP 2023-041969 A 3/2023

OTHER PUBLICATIONS

Ashish Vaswani, et al., "Attention is All you Need," Neural IPS, 31st Conference on Neural Information Processing Systems (NIPS 2017), 2017, pp. 1-11.

(Continued)

*Primary Examiner* — Mohammed R Uddin
(74) *Attorney, Agent, or Firm* — Venable LLP

(57) ABSTRACT

An information processing apparatus acquires object placement information including types and a placement relations of object generated on the basis of measurement information acquired by measuring a real-world space, receives query information from a user, and predicts a response to the query information using an object placement characteristics database storing object placement characteristics representing a positional relation of a plurality of objects on the basis of the object placement information and the query information.

12 Claims, 10 Drawing Sheets

(56) References Cited

U.S. PATENT DOCUMENTS

| | | | | |
|---|---|---|---|---|
| 2013/0238356 | A1* | 9/2013 | Torii | G06Q 10/10 705/2 |
| 2015/0015718 | A1* | 1/2015 | Fujimatsu | H04N 7/181 348/159 |
| 2015/0121216 | A1* | 4/2015 | Brown | G06N 3/006 715/705 |
| 2016/0328379 | A1* | 11/2016 | Tsunokawa | G06F 40/205 |
| 2017/0099200 | A1* | 4/2017 | Ellenbogen | G06N 20/00 |
| 2018/0018508 | A1* | 1/2018 | Tusch | G06V 20/52 |
| 2018/0032031 | A1* | 2/2018 | Du | G06T 19/20 |
| 2018/0115749 | A1 | 4/2018 | Toshiyuki et al. | |
| 2018/0139416 | A1* | 5/2018 | Hirasawa | G08B 25/00 |
| 2019/0049970 | A1* | 2/2019 | Djuric | G06N 20/00 |
| 2019/0130718 | A1* | 5/2019 | Alpert | G08B 19/00 |
| 2021/0225029 | A1 | 7/2021 | Sato | |
| 2021/0232577 | A1* | 7/2021 | Ogawa | G06V 40/174 |
| 2021/0232613 | A1* | 7/2021 | Raval Contractor | G06N 5/02 |
| 2021/0398517 | A1* | 12/2021 | Iwase | G10L 13/027 |
| 2023/0039454 | A1* | 2/2023 | Wang | G05B 19/4184 |
| 2024/0020972 | A1* | 1/2024 | Ding | G06V 20/41 |

OTHER PUBLICATIONS

Charles R. Qi, et al., "PointNet: Deep Learning on Point Sets for 3D Classification and Segmentation," CVPR Apr. 10, 2017, arXiv:1612.00593v2, pp. 1-19.

Heng Wang, et al., "Spatiality-guided Transformer for 3D Dense Captioning on Point Clouds," IJCAI, Apr. 22, 2022, arXiv:2204.10688v1, pp. 1-11.

Jacob Devlin, et al., "BERT: Pre-training of Deep Bidirectional Transformers for Language Understanding," Oct. 11, 2018, arXiv:1810.04805v1, pp. 1-14.

Justin Johnson, et al. "DenseCap: Fully Convolutional Localization Networks for Dense Captioning," CVPR, 2016, pp. 4565-4574.

Shuquan Ye, et al., "3D Question Answering," Journal of LaTex Class Files, vol. 14, No. 8, Aug. 2015, arXiv:2112.08359v2, pp. 1-17.

Keisuke Tateno, et al., "CNN-SLAM: Real-time dense monocular SLAM with learned depth prediction," CVPR, Apr. 11, 2017, arXiv:1704.03489v1, pp. 1-10.

Yonghui Wu, et al., "Google's Neural Machine Translation System: Bridging the Gap between Human and Machine Translation," Oct. 8, 2016, arXiv:1609.08144v2, pp. 1-23.

* cited by examiner

D001

D002

D003

INFORMATION PROCESSING APPARATUS, METHOD, AND STORAGE MEDIUM

BACKGROUND OF THE INVENTION

Field of the Invention

The present disclosure relates to an information processing apparatus, a method, and a program.

Description of the Related Art

In recent years, machines have been configured to be able to recognize object characteristics such as types and positions of objects included in image information or 3D shape information from the image information or the 3D shape information measured by sensors such as cameras and LiDARs through image recognition or 3D shape recognition. In addition, a search in a real-world space for searching for objects included in image information or 3D shape information is configured to be able to be performed.

In U.S. Pat. No. 7,111,422, a suspicious person is detected by identifying a predetermined operation of persons recognized from an image. In addition, in Japanese Patent Laid-Open No. 2023-41969, an operation status is recognized by recognizing joint positions of a person identified from an image.

SUMMARY OF THE INVENTION

However, in related art, operations of data collection, adjustment of parameters and conditions, and setting of a responding operation of a system for a recognized result are complicated for each task for searching for a real-world space.

In consideration of such situations, the present disclosure provides a technology enabling a search of a real-world space without effort.

An information processing apparatus according to one embodiment of the present disclosure, comprises: an object placement information acquiring unit configured to acquire object placement information including object types and a placement relation of objects generated on the basis of measurement information acquired by measuring a real-world space; a reception unit configured to receive query information from a user; and a prediction unit configured to predict a response to the query information using an object placement characteristics database storing object placement characteristics representing a positional relation of a plurality of objects on the basis of the object placement information and the query information. Further features of the present disclosure will become apparent from the following description of exemplary embodiments with reference to the attached drawings.

DESCRIPTION OF THE EMBODIMENTS

Figure 1:
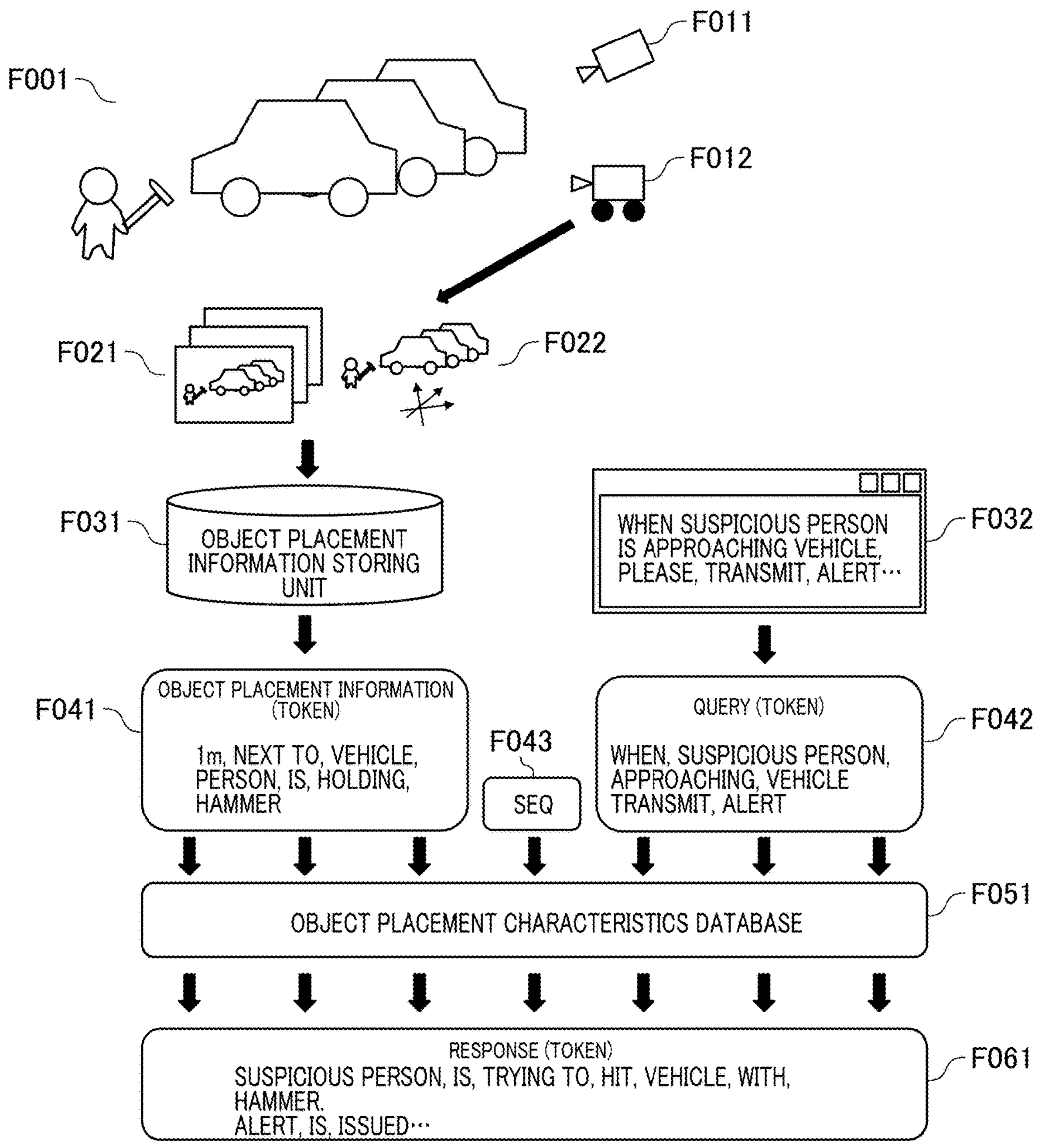
FIG. 1 is a diagram illustrating a use scene and the concept of an operation of a monitoring system according to a first embodiment.

Hereinafter, embodiments according to the present disclosure will be described with reference to the drawings. The following embodiments are not for limiting the invention relating to scopes of the claims, nor are all combinations of features described in the embodiments necessarily essential for the solution of the invention. The same reference signs will be assigned to the same components in the drawings, and description thereof may be omitted.

First Embodiment

In this embodiment, a case in which the present disclosure is applied to the use of an image captured by an imaging device such as a monitoring camera (a monitoring system) will be described as an example. Image recognition and recognition of a 3D space represent one of the most basic problems in computer vision. Image recognition and recognition of a 3D space are not only used for uses of recognition of types of objects, perception of positions, and counting the number of objects but also applied to various tasks such as recognition of a place, avoidance of obstacles in automated driving, and risk prediction. Detection of objects from an image or a 3D shape model, for example, is realized using a neural network that selects a focus area (a rectangle) and determines types of objects included therein.

On the basis of a result of such image recognition or recognition of a 3D space, for example, search tasks for a real-world space such as monitoring of detection of suspicious persons and the like, operation analysis of perception of an operation sequence of an operator of a factory and the like and logistics management such as detection of lost items in factory logistics are performed. However, in order to realize a task for searching for a real-world space, for each task, operations such as collection of data for generating an identifier, adjustment of parameters and conditions, and setting of a responding operation of a system for a recognized result are necessary, and preparation thereof is complicated.

For example, a case in which an alert transmitting system transmitting an alert if a suspicious person is approaching a vehicle in a monitoring task is built will be described as a specific example. First, data used for detecting persons, vehicles, and objects gripped by the persons from an image of a monitoring camera or a camera of a mobile robot is collected in a large quantity. Then, correct answer data is manually given for the data, and, by pairing the data and the correct answer data and training a neural network, an identifier is built.

Next, types of identified objects and parameters and conditions of relative positional relations thereof are registered. For example, in order to detect an approach of a person holding a hammer within 1 m of a vehicle, each object is detected from an image to draw a rectangle, and distances between the center of gravity positions of rectangles are registered as parameters. Then, an operation of the system (for example, transmission of an alert, transmission of a mail to a user, or the like) performed in the case of matching conditions is set. In this way, a system for monitoring a suspicious person is built.

On the other hand, when a human security guard is caused to perform a similar monitoring operation, for example, this can be realized by making a query such as "Recently, there have been many crimes damaging vehicles, so please issue an alert if a suspicious person is approaching a vehicle." In other words, a person can realize a task on the basis of experience and common knowledge even without data collection and setting of parameters, and detailed description of a corresponding operation. An object of this embodiment is to realize a search instruction for such a human and search execution by the human using an information processing apparatus. In other words, an object is to reduce the effort involved in operations such as data collection for generating an identifier, adjustment of parameters and conditions, and setting of a responding operation of a system for a recognized result for each task.

In this embodiment, on the basis of an object placement characteristics database in which "placement relations among objects" in a real-world space are aggregated, objects in the real-world space and information relating to relationship among the objects (corresponding to common knowledge of humans) are used. In accordance with this, a search in the real-world space is realized without performing detailed description of conditions as when asking a human security guard.

<Operation Overview>

FIG. 1 is a diagram illustrating a use scene and the concept of an operation of a monitoring system according to a first embodiment of the present disclosure. monitoring camera F011 is illustrated. A mobile robot F012 including a camera is illustrated. The mobile robot F012 acquires image information F021 that is information of an image obtained by imaging a real-world space F001 and 3D shape information F022 that is a 3D shape model.

Here, in the real-world space F001 illustrated in FIG. 1, as described above, a situation in which a suspicious person, that is, a person holding a hammer, is approaching a vehicle is illustrated. Such a situation is stored in an object placement information storing unit F031 as sentence information (a story including a time series; hereinafter, referred to as a sentence) in which types of objects included in image information or 3D shape information and "object placement information" that is a positional relationship between such objects are written. More specifically, the object placement information storing unit F031 stores as a sentence such as "A person has taken a hammer out of a bag and has approached within 1 meter of a side of the vehicle . . . ." Generation of a sentence from an image or 3D information will be described below.

Query information F032 represents a prompt designating a monitoring target. The query information F032 is a sentence such as "Please transmit an alert if a suspicious person is approaching a vehicle" that is input by a user.

A token F041 illustrates an example in which a sentence, in which object placement information of a real-world space stored in the object placement information storing unit F031 is written, is divided into "tokens" that are minimal units that can be analyzed by a computer. A token F042 is an example in which a sentence that is the query information F032 is divided into "tokens" that are minimal units that can be analyzed by a computer. A token SEQ F043 is a token representing a boundary between a sentence in which object placement information is written and a sentence that is the query information. By inputting these tokens F041 to F043 to an object placement characteristics database F051 in which "placement relations of objects" in the real-world space are aggregated, a response sentence F061 is acquired. As the response sentence F061, for example, a sentence "There is a person attempting to hit the vehicle with a hammer. An alert is issued, . . . " is acquired.

Figure 2:
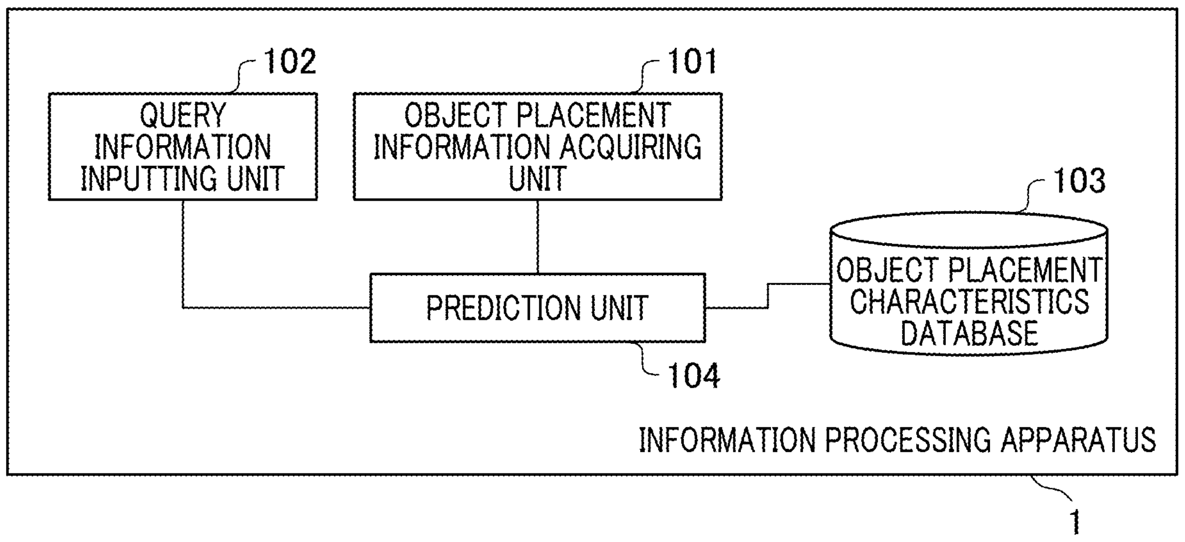
FIG. 2 is a diagram illustrating a functional module configuration of an information processing apparatus according to the first embodiment.

FIG. 2 is a diagram illustrating a functional module configuration of an information processing apparatus 1 according to the first embodiment of the present disclosure. The information processing apparatus 1 has an object placement information acquiring unit 101, a query information inputting unit 102, an object placement characteristics database 103, and a prediction unit 104. The object placement characteristics database is not necessarily included in the information processing apparatus 1, and the database may be stored in another device.

The object placement information acquiring unit 101 acquires information of objects detected from an image captured by a camera that is one example of a measurement unit and a sentence in which placement relations thereof are written from the object placement information storing unit that stores them as first object placement information. The camera, for example, is the monitoring camera F011 illustrated in FIG. 1 or a camera included in the mobile robot F012. The object placement information storing unit, for example, is the object placement information storing unit F031 illustrated in FIG. 1. The image captured by the camera is one example of measurement information measured by a measurement unit.

Sentence generation from an image can be performed using a Johnson technique of extracting object areas from the image using a convolutional neural network and then forming relationships of objects as sentences using an LSTM, or the like. Details of this technique are disclosed in Johnson et al., "Densecap: Fully Convolutional Localization Networks for Dense Captioning", CVPR2016. In accordance with this, the object placement information acquiring unit 101, for example, acquires sentences "A person is holding a hammer. The person and the vehicle are positioned with a distance of 1 m" from the image represented in the image information F021. The object placement information acquiring unit 101 outputs the acquired object placement information to the prediction unit 104 as first object placement information.

The query information inputting unit (a reception unit) 102, for example, receives a query according to a sentence input by a user through a keyboard as query information. In the query information, a placement relation in the real-world space (that is, second object placement information) desired to be asked by a user is included. More specifically, the query information is a sentence "If a suspicious person is approaching the vehicle, please transmit an alert". In the sentence of the query information, a placement relation such as "A suspicious person and the vehicle approach each other" is included. The query information inputting unit 102 outputs such query information to the prediction unit 104.

The object placement characteristics database 103 is a database that stores object placement characteristics representing positional relations of a plurality of objects. The object placement characteristics represent a knowledge database acquired by generalizing a 3D positional relation of objects in the real world. In other words, characteristics of placement relations of objects for determining that the situation is similar to "A person and a vehicle is positioned at the distance of 1 m" and "A suspicious person is approaching the vehicle" are stored inside a database. In addition, characteristics of placement relations of objects for determining that the situation is similar to "A person is holding a hammer" and "a suspicious person" are stored inside a database. In other words, according to the object placement characteristics database 103, when data including types of two or more objects and a placement relation thereof is input, by using the characteristics of the placement relations of objects stored inside, a degree of similarity of the placement relation of the objects and another placement relation can be predicted. A concept of the degree of similarity will be described below with reference to FIGS. 6 to 8.

The object placement characteristics database 103 according to this embodiment is a neural network that has completed in-advance learning trained to estimate the degree of similarity of placement relations of two objects. The object placement characteristics database 103 is a neural network that interprets natural language that is trained to output a response relating to a placement relation of objects. More specifically, the object placement characteristics database 103 is a neural network with 24 stacked layers of transformers of Ashish or the like. Details of this method are disclosed in Ashish et al., "Attention is All you Need", NeuralIPS2017. In this embodiment, the number of dimensions of inputs and the number of dimensions of outputs of the transformer are 512 dimensions, in other words, a configuration in which information of a maximum of 512 object characteristics is input, and outputs of 512 dimensions, which is the same number of dimensions as that of the input, are acquired is employed. More specifically, an encoder network used in a Jacob technique or the like will be applied. Details of this technique are disclosed in Jacob et al., "BERT: Pre-training of Deep Bidirectional Transformers for Language Understanding", arXiv 2018. In learning of this network, learning is performed such that a sentence relating to placement relations of objects is input, and words included in a sentence (response) following it are sequentially predicted.

The object placement information output from the object placement information acquiring unit 101 and the query information output from the query information inputting unit 102 are input to the prediction unit 104. The prediction unit 104 evaluates degrees of similarity of placements of objects included in the object placement information and the query information using the object placement characteristics database 103 on the basis of the object placement information and the query information. The prediction unit 104 predicts a response sentence for the query information on the basis of an evaluation result and outputs a response sentence to a display that is one example of an output unit.

Figure 3:
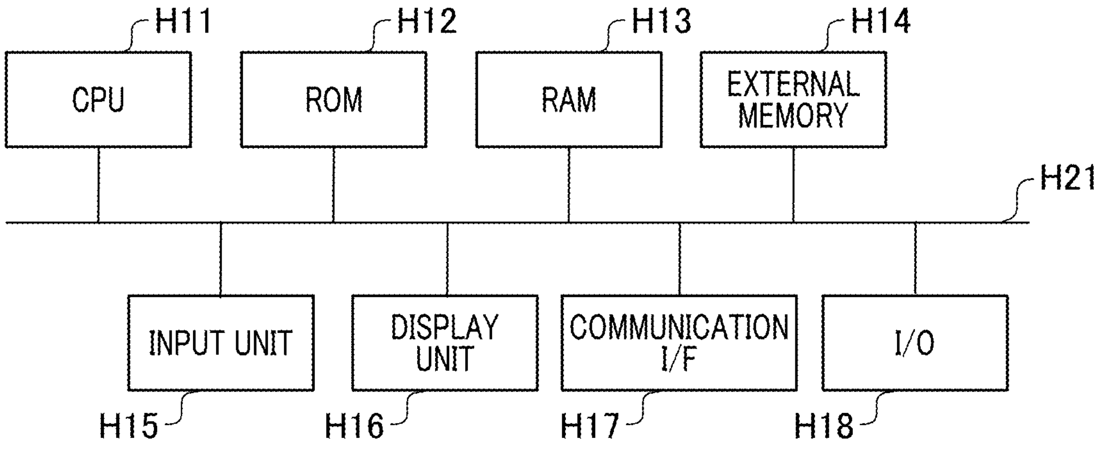
FIG. 3 is a diagram illustrating a hardware configuration of an information processing apparatus 1.

FIG. 3 is a diagram illustrating a hardware configuration of the information processing apparatus 1. The information processing apparatus 1 has a CPU H11, a system bus H21, a ROM H12, a RAM H13, an external memory H14, an input unit H15, a display unit H16, a communication interface H17, and an I/O H18. CPU is an abbreviation of Central Processing Unit. ROM is an abbreviation of Read Only Memory. RAM is an abbreviation of Random Access Memory. I/O is an abbreviation of Input/Output.

By executing a program in which an operation according to this embodiment is described, the CPU executes a process according to this embodiment. In addition, the CPU H11 controls various devices connected to the system bus H21. The ROM H12 stores a BIOS program and a boot program. The RAM H13 is used as a main storage device of the CPU H11. The external memory H14 stores a program that is processed by the information processing apparatus 100. The input unit H15 performs a process of receiving input of information and the like from a keyboard, a mouse, and the like. The display unit H16 outputs an arithmetic operation result of the information processing apparatus 100 in accordance with an instruction from the CPU H11. In addition, the display device may be of any type such as a liquid crystal display device, a projector, or an LED indicator. The communication interface H17 performs information communication through a network. The communication interface may be Ethernet and may be of any type such as USB, serial communication, or radio communication. USB is an abbreviation of Universal Serial Bus. The object placement information acquiring unit 101 inputs object placement information through the communication interface H17. The prediction unit 104 outputs a prediction result through the communication interface H17. The I/O H18 performs other inputs/outputs.

Figure 4:
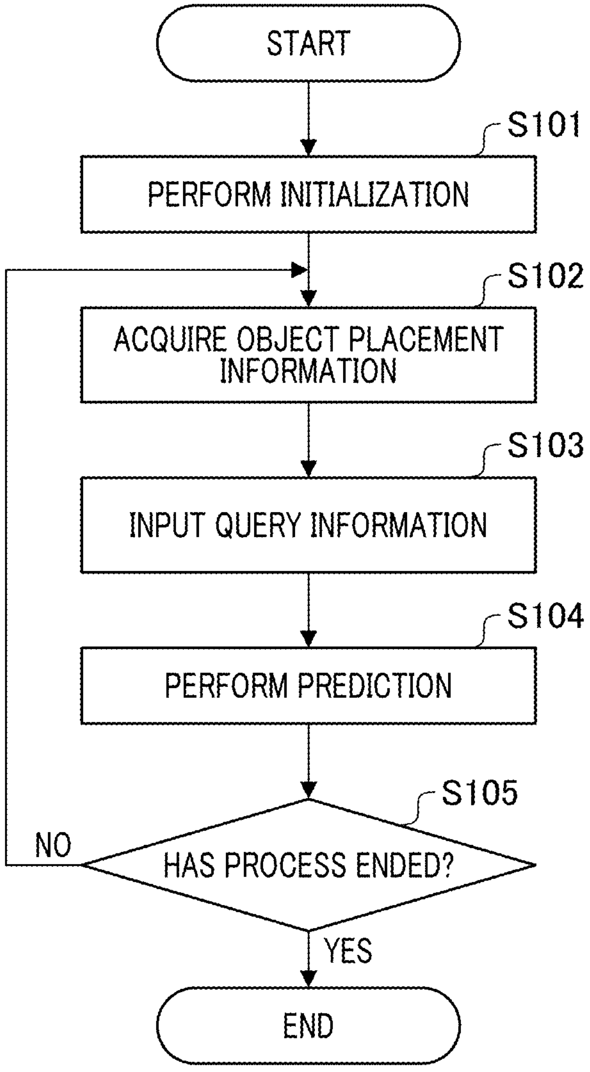
FIG. 4 is a flowchart illustrating an operation of the information processing apparatus 1.

FIG. 4 is a flowchart illustrating an operation of the information processing apparatus 1. The process described in FIG. 4 automatically starts in accordance with start-up of the information processing apparatus 1 according to input of power to a computer executing the information processing apparatus 1.

In Step S101, the information processing apparatus 100 performs initialization of the system. In other words, by reading a program from the external memory H14, the information processing apparatus 1 is set to be in an operable state. In addition, as is necessary, weighting parameters of the neural network that is the object placement characteristics database 103 are read from the external memory H14 into the RAM H13. When a series of initialization processes ends, the process proceeds to Step S102.

In Step S102, the object placement information acquiring unit 101 acquires a sentence in which placement relations of objects in the real-world space are included from the object placement information storing unit F031 as object placement information. In Step S103, a query from a user is input to the query information inputting unit 102 using a sentence as query information.

In Step S104, the prediction unit 104 inputs object placement information and query information to the object placement characteristics database 103 that is a neural network, performs forward propagation, and obtains a response to the query.

In Step S105, the information processing apparatus 100 performs end determination, causes the process to return to Step S102 when the query has not ended, and ends the process when the query has ended.

Figure 5:
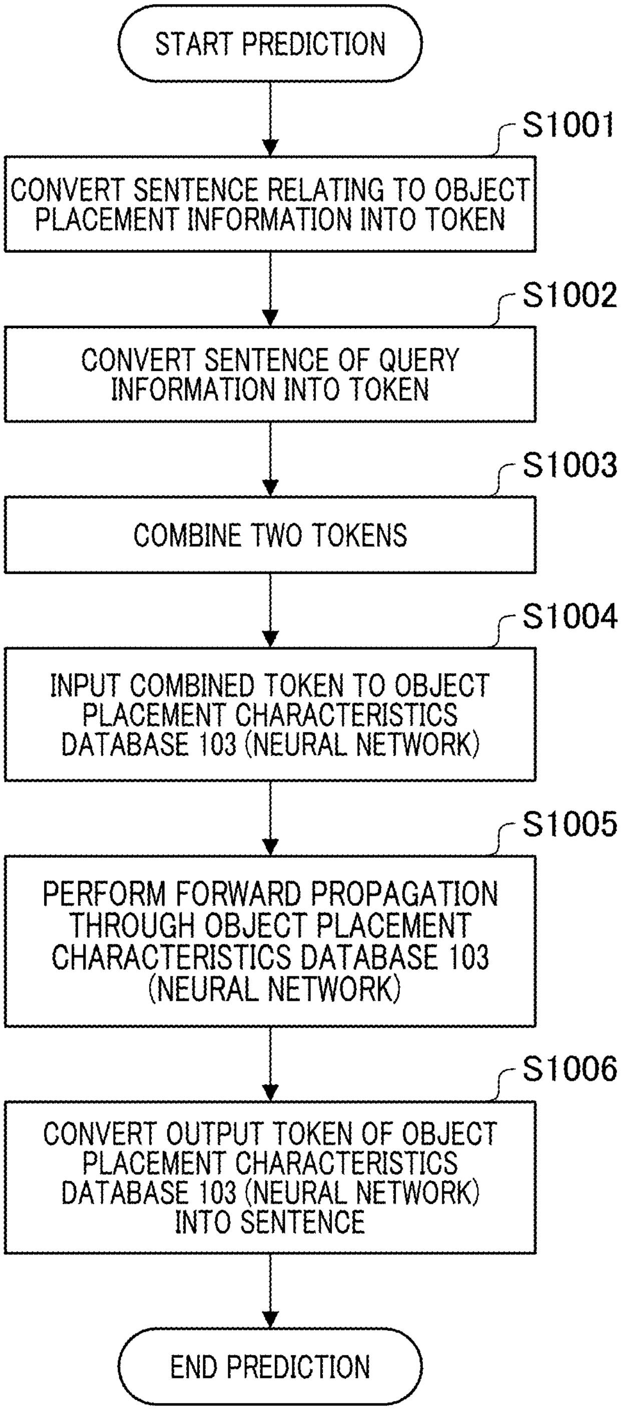
FIG. 5 is a flowchart illustrating details of a process of Step S104 that is a prediction process.

FIG. 5 is a flowchart illustrating details of a process of Step S104 that is a prediction process. In Step S1001 illustrated in FIG. 5, the prediction unit 104 converts a sentence in which a placement relation of objects, which is object placement information, is described into a format from which a neural network can be analyzed. More specifically, the prediction unit 104 performs lexical analysis on a sentence, divides the text into tokens such as words, subwords, and symbols, and assigns an ID to each token.

More specifically, conversion into tokens (encoding) is performed by applying a Yonghui method or the like. Details of this method are disclosed in Yonghui Wu et al., "Google's Neural Machine Translation System: Bridging the Gap between Human and Machine Translation", arXiv: 1609.08144 v2. In Step S1002, similar to Step S1001, the prediction unit 104 converts a sentence, which is query information, into tokens.

In Step S1003, the prediction unit 104 combines the two tokenized sentences. More specifically, the prediction unit 104 aligns two token groups, inserts a special token that represents a boundary between the object placement information and the query information, and generates a combined token to be input into the object placement characteristics database 103.

In Step S1004, the prediction unit 104 inputs the combined token to the object placement characteristics database 103.

In Step S1005, the prediction unit 104 performs forward propagation of an arithmetic operation result to each layer of the neural network that is the object placement characteristics database 103 and obtains an output vector as an output token. More specifically, the prediction unit 104 weights an input token in a transformer block of the object placement characteristics database 103. The object placement characteristics database 103 calculates scores of all the word candidates stored by the object placement characteristics database 103. Subsequently, the object placement characteristics database 103 outputs a word having the highest score and repeats calculation of scores of the word candidates again to obtain an output token group. The concept of the object placement characteristics database 103 analyzing placement information of objects and calculating scores of words will be described below.

In Step S1006, the prediction unit 104 converts (decodes) an output token into a sentence. A Yonghui technique or the like is applied to the decode.

FIGS. 6A to 6C, 7, and 8 are diagrams illustrating an example of the process of Step S1005 in which the prediction unit 104 analyzes placement relations of objects and predicts a response using the object placement characteristics database 103.

Figure 6A:
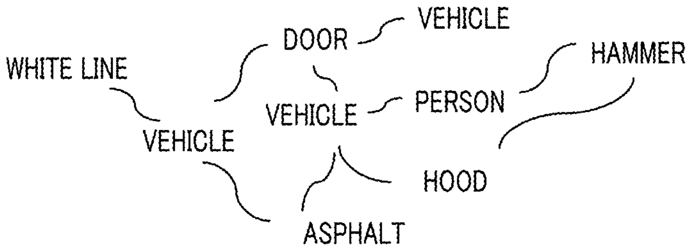
FIGS. 6A to 6C are diagrams illustrating an example of a process of Step S1005 in which a prediction unit 104 predicts a response.

D001 of FIG. 6A is a structure diagram representing placement relations of objects included in measurement information acquired by measuring a real-world space in a graph form. The structure diagram D001 illustrates that a person and a vehicle hood are connected to a hammer and are located at spatially close positions.

Figure 6B:
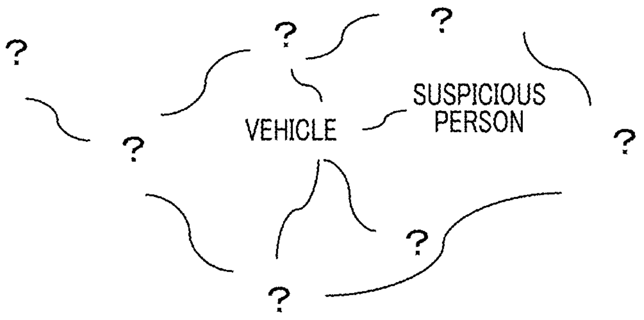
Figure 6C:
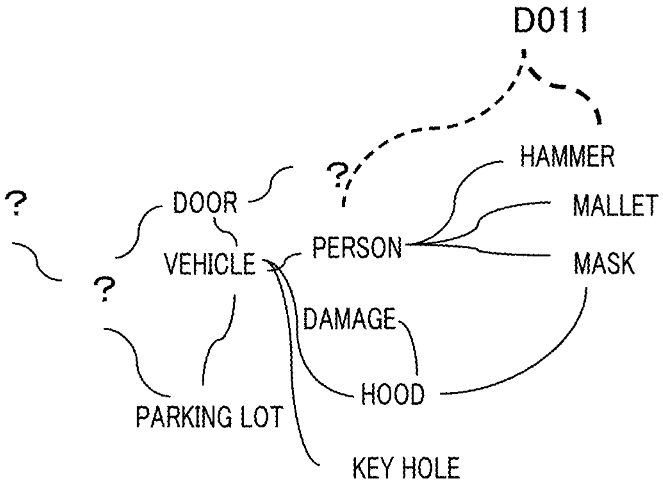

D002 of FIG. 6B is a structure diagram illustrating placement relations of objects included in query information in a graph form. The structure diagram D002 illustrates that a vehicle and a suspicious person included in the query information are located at close positions. In the structure diagram D002, placement information of objects not included in the query information is denoted by "?".

The object placement characteristics database 103 is a neural network that has learned prior probabilities of placement relations of objects denoted by "?" included in the structure diagram D002. In other words, as illustrated in an inference result D011 in the structure diagram D003 of FIG. 6C, the object placement characteristics database 103 infers that a suspicious person is a person, and an object such as a hammer, a mallet, or a mask is spatially close near the person in the case of the suspicious person. In addition, the object placement characteristics database 103 infers that a vehicle, a hood, and a damage are spatially located near due to the suspicious person being close to the vehicle.

Figure 7:
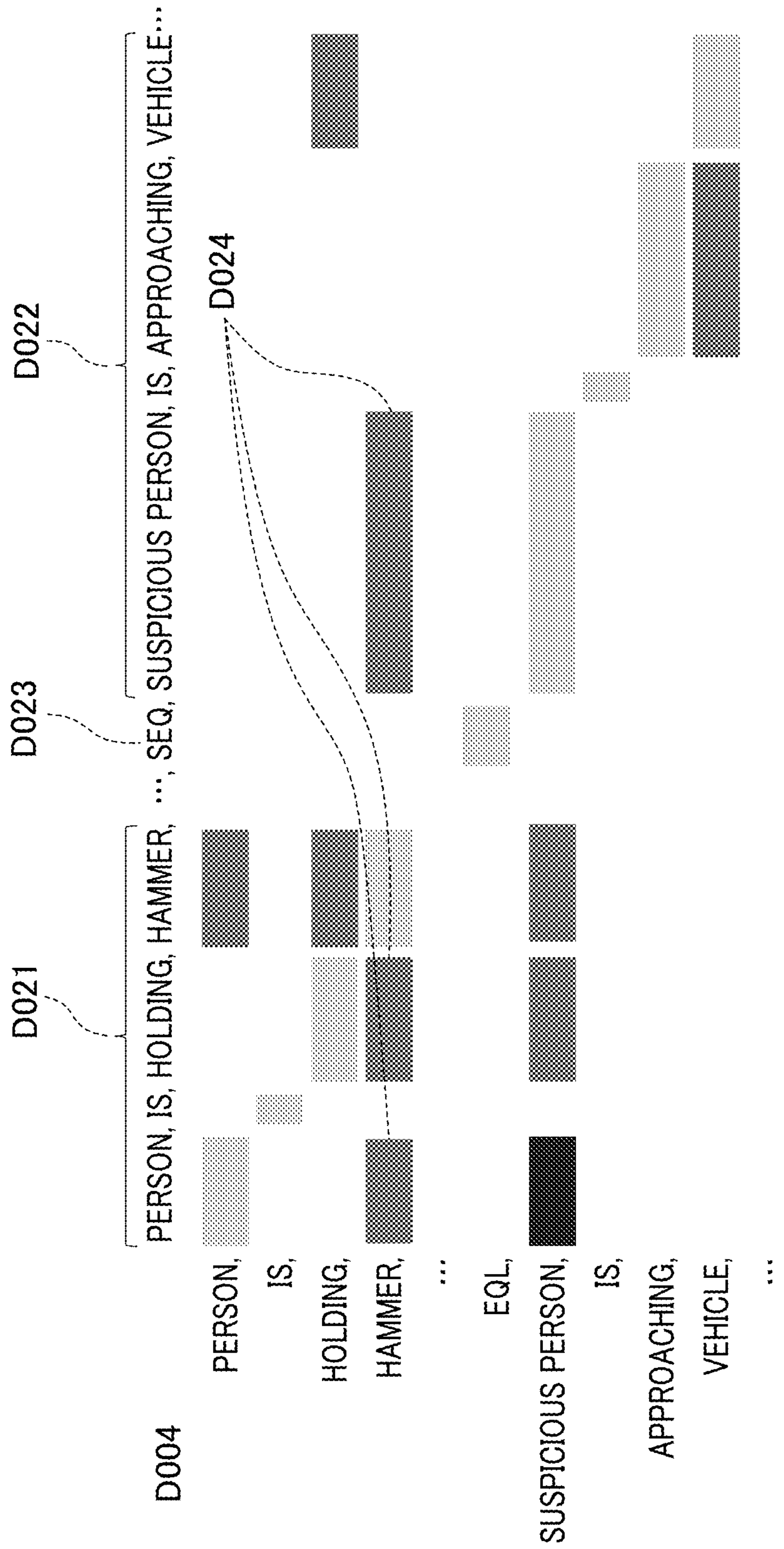
FIG. 7 is a diagram illustrating an example of the process of Step S1005 in which the prediction unit 104 predicts a response.

D004 of FIG. 7 is a diagram conceptually illustrating an appearance in which the object placement characteristics database 103 analyzes object placement information and query information. A token D021 is a token converting a sentence that is object placement information of the real-world space. A token D022 is a token converting a sentence that is query information. A token D023 is a token that represents a division of a sentence. D004 is a diagram representing a mutual relation of words input to the object placement characteristics database 103 as a two-dimensional array. In D024, a token corresponding to a "suspicious person" and tokens that are spatially and semantically close are denoted using a dark grey that is a color representing a high degree of relevance. More specifically, a "suspicious person" included in query information is spatially and semantically close to a "person" and a "hammer" included in the object placement information".

Such a relationship is learned in advance in a transformer block inside the object placement characteristics database 103. In other words, a degree of similarity according to this embodiment is an attention value of tokens representing two objects that are output using weighting factors that have been learned in advance in a transformer block. The higher the degree of relevance of a positional relation of two objects, the larger the attention value.

Figure 8:
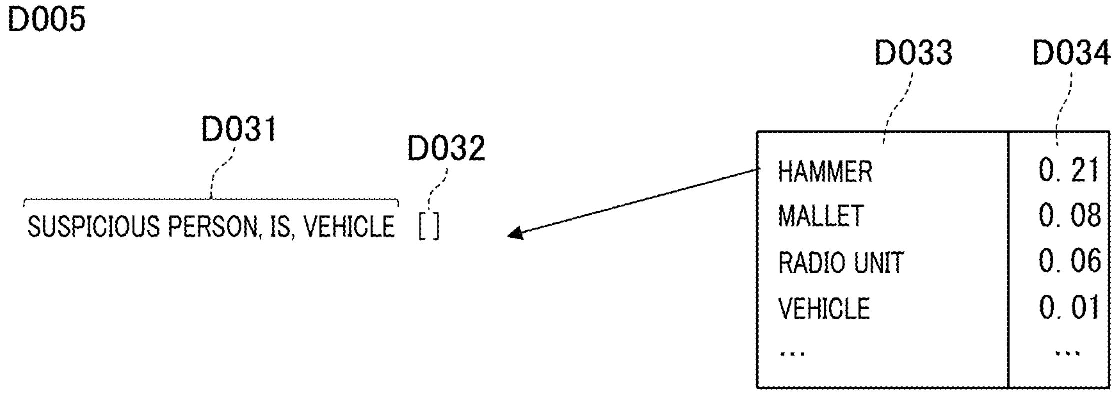
FIG. 8 is a diagram illustrating an example of the process of Step S1005 in which the prediction unit 104 predicts a response.

D005 of FIG. 8 is a diagram illustrating an appearance in which an output layer of the object placement characteristics database 103 predicts a sentence. A token D031 is token that has been predicted. A token D032 is a token that is subsequently predicted. A candidate D033 is a candidate of a predicted word, and a prediction reliability D034 is assigned to each word. On the basis of a prior probability of placement of object maintained by the object placement characteristics database 103 and a placement relation between words included in an input sentence D004, a word to be output next is selected.

Here, for example, a sentence "A person has taken a hammer out of a bag and has approached within 1 m of the vehicle with holding the hammer . . . " that is object placement information is assumed to be input to the object placement characteristics database 103. In addition, a sentence "If a suspicious person is approaching the vehicle, please transmit an alert." that is query information is assumed to be input to the object placement characteristics database 103. In this case, the object placement characteristics database 103 operates as described above and obtains an output (response) "A suspicious person is trying to hit the vehicle with a hammer. An alert is issued".

<Effects>

As described above, in the first embodiment, on the basis of object placement information generated on the basis of measurement information acquired by measuring a real-world space and placement relation of objects included in query information, a response to the degree of similarity of placement relations of objects is predicted. In this way, for each task for searching in the real-world space, it is possible to query the real-world space using a sentence without operations such as data collection for generating an identifier, adjustment of parameters and conditions, selection of an operation of a system for a recognized result. For this reason, the complexity of building a search system and making queries can be reduced.

Modified Example 1-1

In the first embodiment, a sentence in which placement relations of objects included in measurement information acquired by measuring the real-world space is described is set as object placement information. The object placement information according to the present disclosure is not limited to a sentence and may have a data structure from which the object placement characteristics database 103 can determine placement relations of objects. The present disclosure may store object placement information in a format summarizing a placement relation, for example, such as an itemized list or may store object placement information in a format according to a specific rule such as a yaml format. In the present disclosure, the object placement information, for example, may be configured to store a scene graph in which IDs of objects are set as nodes, and relative positional relations thereof are set as edges not as text data but as metadata. In this way, the object placement information is object type information of two or more objects and information representing positional relation information between at least one or more objects that are generated on the basis of measurement information acquired by measuring the real-world space. The positional relation information may also be adverbs that represent object type names in a sentence and a positional relationship thereof. In addition, the positional relation information may be a distance between objects or a direction in which an object and another object are positioned as relative positional information of objects.

In the first embodiment, a response is generated on the basis of first object placement information that is a sentence in which placement relations of objects included in the measurement information acquired by measuring the real-world space are described and placement relations of objects included in a query sentence. In other words, analysis is configured to be performed inside a neural network even without clearly generating second object placement information that is a placement relation of objects included in a query sentence. On the other hand, a configuration in which the second object placement information is explicitly generated from a query sentence, and a response is generated on the basis of the first object placement information and the second object placement information can also be realized. For example, by using a neural network that has learned to output placement relations of objects in the yaml format for a query sentence, object placement information is stored in the yaml format (this is the second object placement information). Next, by inputting the first object placement information and the second object placement information to the object placement characteristics database 103, a response is obtained. In this way, by explicitly generating the second object placement information from query information, a user can determine whether or not the prediction unit appropriately recognizes placement relations of objects included in the query information. In addition, by correcting the query sentence and reinputting the corrected query sentence in a recognizable form in the case of no recognition, a query can be performed with higher accuracy.

In the first embodiment, a response is generated on the basis of a degree of similarity of placement relations of objects. When a response can be generated on the basis of a degree of relevance between an event of the real-world space and an event of query information, a response can also be generated with time series information (first time series information) being taken into account in addition to the placement relations. More specifically, respective imaging time information is assigned to object placement information generated from image information of a time series to be formed as a sentence. For example, in the example of the first embodiment, a sentence "A person, took a hammer out of a bag" is formed. In this way, a change in the placement of objects can be perceived with higher accuracy, and thus the accuracy of a response is improved.

In addition, when time series information (second time series information) is assigned also to the query information, a response may be generated on the basis of a degree of similarity of time series information of the real-world space and time series information included in the query information. In other words, a query sentence "Before a suspicious person causes a damage to the vehicle, please transmit an alert as soon as possible" is assumed to be input. In this case, at a time point at which an event "A person took a hammer out of a bag" is acquired rather than an event "A person holding a hammer is approaching the vehicle" in the real-world space, a response of transmitting an alert can be output. In this way, the accuracy of a response can be improved.

In addition to type information of objects, characteristics information of objects can be stored as object placement information. The characteristics information of an object is information used for specifying the object in more detail such as a size, a color, an orientation, a velocity of the object. By assigning such information, objects included in a query sentence can be specified more accurately. For example, a query sentence "Please transmit an alert such that a suspicious person does not cause a damage to my red vehicle" is assumed to be input. In this case, when an event of "A person is approaching a blue vehicle" is acquired in the real-world space, erroneous transmission of an alert can be inhibited. In this way, the accuracy of a response can be improved.

In the first embodiment, the object placement characteristics database 103 is a neural network model using a transformer. The object placement characteristics database 103 is not limited thereto, may be any other as long as it can generate a response based on placement relations of objects, may be a convolution network, convolutional network, a fully-connected network, an RCN, or the like, and is not particularly limited. Furthermore, the object placement characteristics database 103 is not limited to a neural network model and may be a Bayesian network. In addition, the object placement characteristics database 103 may be a database that stores object placement information. If a database is used, a response similar to object placement information of the real-world space and a positional relation of objects included in the query information, which have been input, out of object placement information, which was collected in the past, registered in the object placement characteristics database 103 may be configured to be returned. By using such a configuration, compared to the case of a neural network, the process can be realized with a small amount of calculation.

In the first embodiment, a degree of similarity of placements of objects is an attention value of tokens representing two objects calculated using weighting factors stored inside the neural network maintained by the object placement characteristics database 103. The degree of similarity is not limited thereto as long as it can represent whether or not placement relations of objects are similar to each other. For example, when two placement relations are input, a difference in distances between objects or a difference between directions in which another object is positioned with respect to a certain object in the two placement relations can be used as the degree of similarity. When placement relations of objects are stored in a graph structure, as a degree of similarity of graphs, for example, a graph form in a Graph Edit Distance algorithm can be also used as the degree of similarity.

In the first embodiment a response to query information is a sentence. In other words, if a phrase "please transmit an alert" is included in a query sentence, when a placement relation of objects matches a query condition, a response "an alert is transmitted" is obtained. If a placement relation of objects matches a sentence pattern of "an alert is transmitted" of such a response sentence, a configuration in which an alert transmitting unit transmits an alert can be employed. However, although a predetermined operation is not configured to be performed if the placement relation matches the sentence pattern, a configuration in which a signal "1" is output if the object placement characteristics database 103 directly performs a predetermined operation, and a signal "0" is output otherwise may be employed. More specifically, for example, a fully-connected layer of a neural network is connected to an output layer of the object placement characteristics database 103. Then, by learning such that the signal "1" is formed if an instruction of a predetermined operation is included in query information, and the placement relation of the real-world space matches the placement relation included in the query information, and the signal "0" is formed otherwise, the configuration can be realized. In this way, if the placement relation of the real-world space matches a condition included in the query information, the information processing apparatus 1 can be instructed to perform a predetermined operation. Here, the predetermined operation is not limited to transmission of an alert, and a configuration for driving a specific device or software through the I/O H18 such as lighting of a lamp, transmission of a mail, or the like can be realized as long as it is a configuration in which an operation included in query information is executed.

By configuring the query information inputting unit 102 according to the first embodiment using a keyboard and displaying a response output by the prediction unit 104 on a display as a display unit, a chatting system searching for the real-world space can be configured. The input unit is not limited to a keyboard and may be an arbitrary unit as long as it can input a query sentence such as a touch display or a voice input. In addition, the display unit is not limited to a display and may be an arbitrary unit as long as it can output a response such as a projector or a voice output.

Second Embodiment

In the first embodiment, a response is generated on the basis of one or more pieces of query information input by a user. On the other hand, in one piece of query information, there is a case in which whether a placement relation is similar to the object placement information cannot be specified. In other words, this case is a case in which information is insufficient such as a case in which a placement relation of objects included in query information is insufficient or a case in which the placement information is ambiguous. In a second embodiment, a configuration supplementing such insufficient information, more specifically, a configuration in which a degree of reliability is assigned to a word output by the object placement characteristics database, and input of more detailed query information is requested if the degree of reliability is lower than a predetermined level will be described.

A configuration diagram and a processing flow of an information processing apparatus according to the second embodiment are the same as those according to the first embodiment. In the second embodiment, a difference from the first embodiment is that an object placement characteristics database 103 predicts a degree of reliability of a response in Step S1005, and a response requesting input of more detailed query information is generated when the degree of reliability is equal to or lower than a predetermined level. More specifically, when a score of each word candidate is calculated in Step S1005, a prediction unit 104 determines that a placement relations of objects included in a query sentence is insufficient if the score is equal to or lower than a predetermined value. In addition, in such a case, an output requesting a more detailed placement relation is generated. For example, query information "When there is a suspicious person, please output an alert" is assumed to have been input. In this case, in the output of the object placement characteristics database 103, when " . . . part" of "a suspicious person, . . . " was predicted, a plurality of candidates of words were present and could not be narrowed down into one word, in other words, the degree of reliability is assumed to be low. In this case, a response "If a suspicious person is present at any place, please output or input an alert" requesting a placement relation relating to a place at which a suspicious person is located is output. In other words, a response output by an information processing apparatus 1 is a query requesting additional information. For this response (a query requesting additional information), as query information, a user, for example, additionally inputs insufficient information (third object placement information) "If a suspicious person enters a 3 m-radius range of my vehicle, please output an alert" as query information. The information processing apparatus 1 obtains a placement relation that is insufficient information "the 3 m-radius range of the vehicle".

<Effects>

In this modified example, if the degree of reliability of the output of the object placement characteristics database 103 decreases, a response prompting input of more detailed placement relation of objects to query information is generated. In this way, a response matching query information can be more accurately generated on the basis of placement relations of objects of the real-world space.

In this modified example, scores assigned to candidates of words are set as degrees of reliability. Instead of such a configuration, a configuration in which a response causing input of more detailed placement information of objects as query information is generated if query information is ambiguous may be employed. For example, by connecting a fully-connected layer that has learned to output a binary value indicating whether or not query information is ambiguous to the object placement characteristics database 103, a response "Please input in more detail" may be configured to be output if an ambiguous output is obtained. In this way, if query information is ambiguous, an incorrect response can be inhibited, and thus a response can be generated with higher accuracy.

In addition, even without directly calculating the degree of reliability, if the prediction unit 104 determines that query information is ambiguous as an internal state, a response directly requesting insufficient information can be output as well. The object placement characteristics database 103 may have learned to request a more detailed input if the query information is ambiguous. In other words, by inputting object placement information and query information that cannot be responded from the object placement information and preparing a data set responding to request insufficient information, the object placement characteristics database 103 has been learned. In this way, a response can be generated without directly calculating the degree of reliability.

Furthermore, as a case in which query information is ambiguous, if a plurality of events of placement relations of objects of the real-world space are matched, a response prompting input of any one thereof as query information may be configured. More specifically, if a difference between score values of a plurality of candidates is equal to or less than a predetermined value, a response "Please select" one of these two candidates is configured to be output. In this way, if query information is ambiguous, a user is able to be allowed to select a target condition, and thus a response can be generated with higher accuracy.

In addition, a configuration in which a user is prompted to newly input additional query information indicating whether a placement relation of objects included in query information recognized by the object placement characteristics database 103 is correct may be employed. More specifically, the placement relation of objects included in query information is substituted with another expression and is responded in accordance with object placement characteristics included in the object placement characteristics database 103. In addition, a placement relation of objects included in the response acquired through substitution with the other expression is stored in a query information storing unit as supplementary information for query information in addition to the query information. For example, in the case of a query "If a suspicious person is approaching the vehicle, please output an alert", a search condition "If a suspicious person has approached within 1 m of the vehicle, is it OK to transmit a notification mail?" is generated as a response. At this time, the prediction unit 104 predicts that "A distance between a suspicious person and the vehicle is 1 m or less" and "An alert is the transmitting of a notification mail" using placement characteristics of objects included in the object placement characteristics database 103. Then, a user is responded to check that prediction details are configured according to the intention of the query. In this way, by prompting a response indicating whether a condition designated by the user is as intended, designation of an incorrect condition can be prevented, and a search condition of the real-world space can be registered with less effort.

In addition, a configuration in which a user is requested to newly input additional query information only when the degree of reliability of a response acquired through substitution with the other expression according to object placement characteristics included in the object placement characteristics database 103 is larger than a predetermined value can be employed as well. In this way, a user is requested for additional query information only when query information that is non-deterministic is input, and thus user's efforts for inputting query information can be reduced.

Third Embodiment

In the first embodiment, the prediction unit 104 performs prediction on the basis of object placement information that is a sentence representing placement relations of objects of the real-world space on the basis of measurement information, which is measured by the measurement device in advance, stored by the object placement information storing unit. In a third embodiment, a configuration in which object placement information is generated on the basis of measurement information acquired by measuring the real-world space in real time, and a query is given for object placement information that is sequentially updated will be described.

Figure 9:
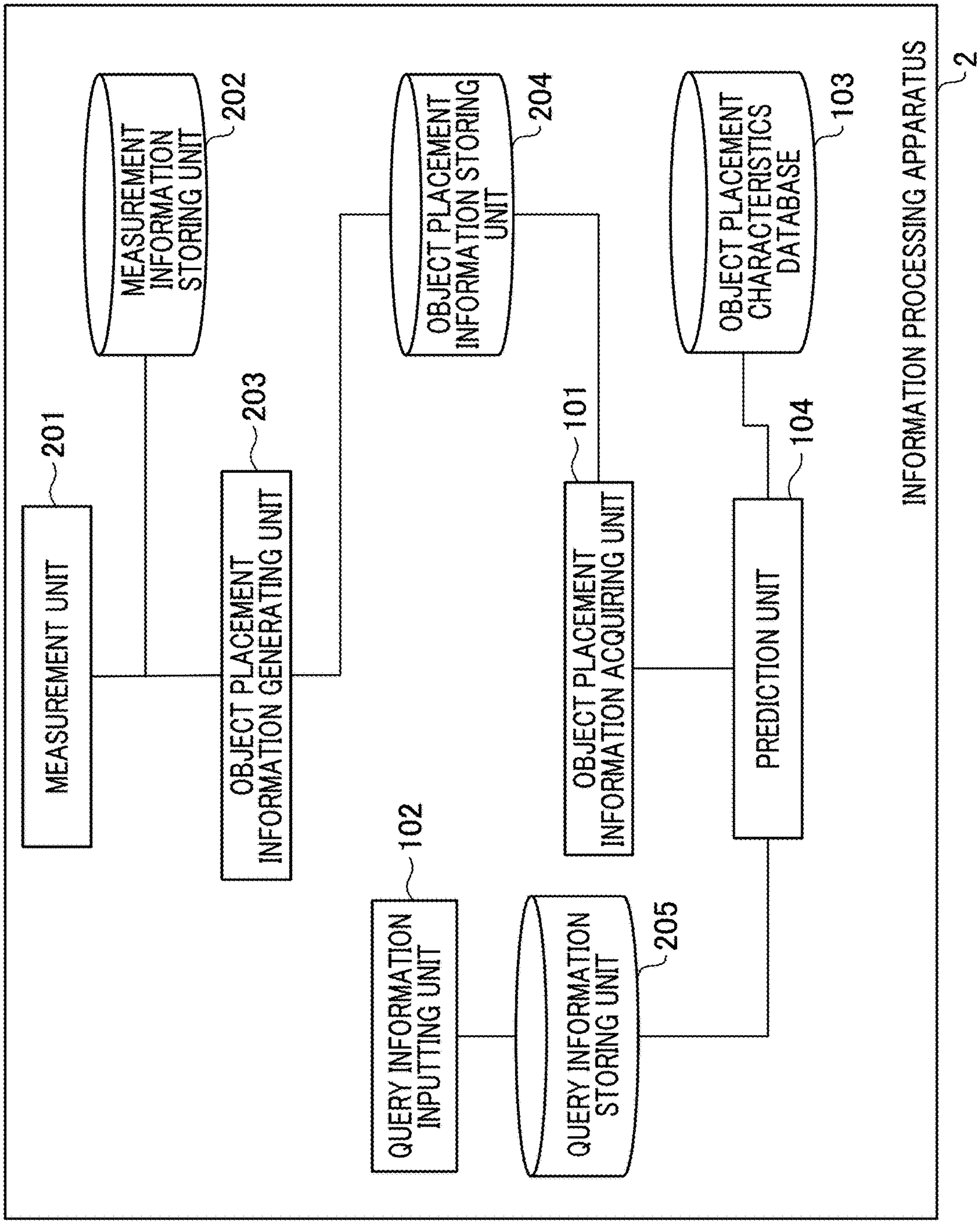
FIG. 9 is a diagram illustrating a search system of a real-world space including an information processing apparatus 2 according to a third embodiment.

FIG. 9 is a diagram illustrating a search system of a real-world space including an information processing apparatus 2 according to the third embodiment of the present disclosure. The information processing apparatus 2 has a measurement unit 201, a measurement information storing unit 202, an object placement information generating unit 203, an object placement information storing unit 204, and a query information storing unit 205 in addition to the configuration of the information processing apparatus 1. Hereinafter, in the information processing apparatus 2, components added to the information processing apparatus 1 will be described in detail. The same reference signs will be assigned to the same components as those of the information processing apparatus 1, and description thereof will be omitted.

The measurement unit 201 is a depth camera that acquires images and depth images as measurement information acquired by measuring the real-world space. The images and the depth images input from the depth camera are stored in the measurement information storing unit 202. The measurement information storing unit 202 stores images and depth images as measurement information measured by the measurement unit 201.

The object placement information generating unit 203 generates a sentence in which object types included in images and depth images stored by the measurement information storing unit 202 and placement relations thereof are written as object placement information. The object placement information storing unit 204 stores object placement information that is a sentence generated by the object placement information generating unit 203. In addition, the object placement information storing unit 204 outputs the stored object placement information to an object placement information acquiring unit 101.

The query information storing unit 205 stores a history of query information received by a query information inputting unit 102. In addition, the query information storing unit 205 outputs the stored query information to the prediction unit 104.

Figure 10:
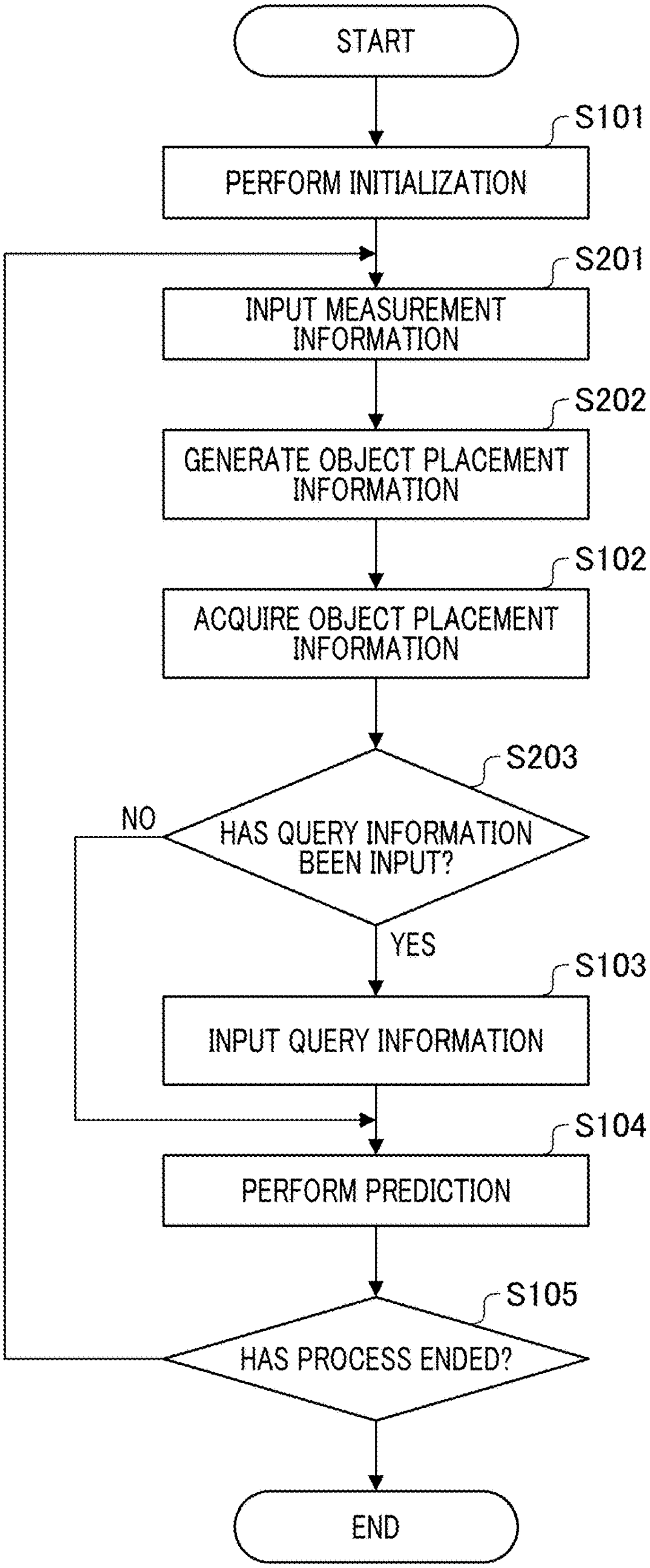
FIG. 10 is a flowchart illustrating an operation of the information processing apparatus 2 according to the third embodiment.

FIG. 10 is a flowchart illustrating an operation of the information processing apparatus 2 according to the third embodiment of the present disclosure. The information processing apparatus 2 according to the third embodiment executes a measurement information inputting process (Step S201), an object placement information generating process (Step S202), and a query information input determining process (Step S203) in addition to the processes according to the first embodiment illustrated in FIG. 4. Hereinafter, in the information processing apparatus 2, the processes added to the information processing apparatus 1 will be described in detail. The same reference signs will be assigned to the same processes as those of the information processing apparatus 1, and description thereof will be omitted.

In Step S201 following Step S101, the measurement unit 201 that is a depth camera receives an image and a depth image, which are inputs, as measurement information. The measurement unit 201 outputs the image and the depth image that have been input to the measurement information storing unit 202 as measurement information. The measurement information storing unit 202 stores measurement information from the measurement unit 201.

In Step S202, the object placement information generating unit 203 generates 3D shape data using SLAM. The SLAM is an abbreviation of Simultaneous Localization and Mapping. In addition, in Step S202, the object placement information generating unit 203 performs object labeling of pixels using semantic segmentation on the basis of input images altogether. In addition, in Step S202, the object placement information generating unit 203 assigns an object label to the 3D shape data on the basis of the 3D shape data (a 3D shape model) and the object label that have been generated. Such a series of processes are described in detail in Tateno et al., "CNN-SLAM: Real-time dense monocular SLAM with learned depth prediction", CVPR2019, and this is applied. Next, in Step S202, the object placement information generating unit 203 forms the generated 3D shape data as a sentence on the basis of a relative positional relation of objects inside the 3D space. In the formation of a sentence, a technique for captioning a transformer-based 3D model that has been learned to generate a caption by focusing on a relative positional relation of objects by receiving 3D shape data as an input is applied. Details of this technique are disclosed in Heng Wang et al., "Spatiality-guided Transformer for 3D Dense Captioning on Point Clouds", IJCAI 2022. The object placement information generating unit 203 outputs object placement information that is a sentence describing placement relations of objects generated on the basis of the measurement information in this way to the object placement information storing unit 204. The object placement information storing unit 204 stores the object placement information from the object placement information generating unit 203. Following Step S202, the process of Step S102 is executed.

In Step S203 following Step S102, the query information inputting unit 102 determines presence/absence of input of new query information. If the query information inputting unit 102 determines the presence of input of new query information, the process of Step S103 is executed. If the query information inputting unit 102 determines the absence of input of new query information, the process of Step S104 is executed.

In Step S105, the information processing apparatus 100 performs end determination, causes the process to return to Step S201 when the query has not ended, and ends the process when the query has ended.

<Effects>

As described above, a response relating to a degree of similarity of placement relations of objects is predicted on the basis of object placement information generated on the basis of measurement information acquired by the measurement unit performing measurement in real time and placement relations of objects included in the query information. In this way, a query of a real-world space changing from time to time can be made using a sentence without effort, and thus, the complexity of building a search system and making queries can be reduced.

Modified Example 3-1

Although the measurement unit is a depth camera in the third embodiment, in the present disclosure, the measurement unit is an arbitrary unit as long as it is a sensor capable of acquiring objects of the real-world space and positional relations thereof. A measurement result of the sensor is sensor information. For example, the measurement unit may be a stereo camera or a multi-camera. Furthermore, the measurement unit may be a 3D LiDAR that obtains 3D point groups. In acquisition of object types and positional relations thereof in the case of using the 3D LiDAR, for example, a type label of an object is assigned to a point group using a method according to Charles and the like that is a neural network recognizing an object type from a 3D point group. Details of this method are disclosed in Charles R. Qi et al., "PointNet: Deep Learning on Point Sets for 3D Classification and Segmentation", CVPR2017. In this way, object placement information generated on the basis of measurement information acquired using a plurality of measurement methods can be used, and thus a query that further matches the real-world space can be made.

If the degree of reliability of output is low in the second embodiment, by determining that there is insufficiency or error in object placement information generated on the basis of measurement information, generation of a sentence from the measurement information according to the third embodiment may be performed again. More specifically, if the degree of reliability predicted by the prediction unit 104 is lower than a predetermined level, adjustment of parameters relating to detection of objects such as lowering of a threshold for enabling detection of more objects from image information is performed. Next, objects detected by changing the parameters are input to form a sentence. In this way, even if there is an excess or insufficiency in object placement information that has been generated once, object placement information can be generated again, and query information can be responded with higher accuracy.

In the third embodiment, a sentence in which placement relations of objects included in image information and 3D shape information are written is generated as object placement information, and the prediction unit 104 predicts a response on the basis of the generated sentence (the object placement information) and a query sentence. For example, when a neural network has learned to generate a response by inputting 3D shape data and a query sentence, the prediction unit 104 can predict a response without generating a sentence as object placement information. In such learning, a method such as Shuquan or the like can be applied, and thus detailed description thereof will be omitted. Details of this method are disclosed in Shuquan et al., "3D Question Answering", CVPR2021.

In the third embodiment, both object placement information based on measurement information of the real-world space and query information are configured to be updated. Such an update may be performed for only one thereof. In other words, a configuration in which query information is registered in advance, and a response is generated every time the object placement information is updated can be realized as well. To the contrary, a configuration in which query information is updated by inputting a plurality of pieces of query information from a user to object placement information that has been generated once can be realized as well.

Modified Example 3-2

In the first embodiment, a method for applying this embodiment to a monitoring system making a query of monitoring conditions of the real-world space using a sentence on the basis of object placement information of the real-world space has been described. The task of making a query of the real-world space is not limited to a monitoring task as long as it can search for conditions desired by the user on the basis of the object placement information of the real-world space.

For example, the first embodiment can be applied also to operation analysis of a device assembly process in a factory. In other words, a configuration in which positional relations of hands, tools, and parts in a time series, which are captured in a video on the footage of operators acquired by the measurement unit are stored as object placement information and are used for analyzing an operation sequence and an operation difference for each operator is employed. By performing detection of objects from an image obtained from a camera imaging the footage of an operator, a relative positions/posture of the objects is obtained. By associating this relative position/posture with an imaging time at which the camera has captured the image, the object and such a time-series positional relation thereof are obtained. This is formed as a sentence and is stored. Subsequently, by inputting a query sentence, the prediction unit 104 generates a response using the object placement characteristics database 103. More specifically, a sentence is assumed to have been input as query information. The input sentence is "As a correct operation sequence, first, tweezers are held by the left hand, and a part is held by the right hand. Subsequently, the part is mounted in a device on the front side by pinching it with tips of the tweezers. If there is a difference in operation time between operators in this process, please tell me the reason." The prediction unit 104 gives a response "An operation time of Operator B is long. The reason for this is that the part is placed between flat sides of the tweezers, and thus, at the time of being mounted in the device, the part may easily fall." In other words, for "an object placement relation in which the part is positioned at tip ends of the tweezers" included in query information, "an object placement relation in which the part is positioned on flat sides of the tweezers" acquired by measuring the real-world space is recognized, and a difference in the operation sequences is extracted.

In this way, by comparing the object placement relation of the real-world space with the placement relations of objects included in the query information, this information processing apparatus can be applied also to a query task in operation analysis.

Furthermore, the present disclosure can be applied also to a task for searching for a place at which an item is present. For example, in a logistics warehouse, incoming items are imaged using a monitoring camera, a camera placed in a mobile device such as a robot, and the like (measured by the measurement unit). A positional relation of items included in the measurement information is formed as a sentence in association with a time and is stored as object placement information. Subsequently, a user inputs a query sentence, and the prediction unit 104 generates a response using the object placement characteristics database 103. For example, it is assumed that a sentence "Although 10 items A were supposed to be present on a B shelf, only 9 items were present. Where is the remaining one?" has been input as query information. The prediction unit 104 gives a response "The item A has fallen during delivery from a C place to the B shelf. The item A is present in a passage from the C place to the B shelf." In other words, for "time-series position information of the item A" of the real-world space, a search for "The position information of the item A that is not present on the shelf B" included in the query information was performed. In this way, the present disclosure can be applied also to a management task in logistics.

In this modified example, examples in which the present disclosure is used in operation analysis and management in logistics have been described. In this way, the present disclosure is not limited to monitoring, operation analysis, and a logistics management task and can be applied to an arbitrary task as long as it is a task for performing a search in association with the object placement relation of the real-world space and placement relations of object included in query information.

The query information storing unit 205 may have not a configuration for storing query information of one task but may have a configuration for storing query information of a plurality of tasks. More specifically, as query information, there are queries "Query 1: Issue an alert if a suspicious person is approaching the vehicle. Query 2: When there is a lost item in a parking lot, please email to a security guard." In this way, when the query information storing unit 205 stores query information of a plurality of tasks, the prediction unit 104 predicts a response for each query, whereby a plurality of search tasks can be simultaneously performed by one information processing apparatus.

Other Embodiment

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described Embodiments and/or that includes one or more circuits (e.g., application specific integrated circuit (ASIC)) for performing the functions of one or more of the above-described Embodiments, and by a method performed by the computer of the system or apparatus by, for example, reading out and executing the computer executable instructions from the storage medium to perform the functions of one or more of the above-described Embodiments and/or controlling the one or more circuits to perform the functions of one or more of the above-described Embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-200462, filed Nov. 28, 2023, which is hereby incorporated by reference wherein herein in its entirety.

What is claimed is:

1. An information processing apparatus comprising:

one or more memories storing instructions; and one or more processors executing the stored instructions to:

(1) acquire object placement information including (a) types of two or more objects and (b) positional relation information representing a three-dimensional positional relation between at least two of the objects in a real-world coordinate system, wherein the positional relation information includes at least one of: (i) a three-dimensional relative position between the objects, and (ii) a three-dimensional direction in which one of the objects is positioned relative to another of the objects, and wherein the object placement information is generated on the basis of measurement information acquired by measuring a real-world space;

(2) receive, from a user, query sentence information;

(3) generate a combined token sequence by: (i) tokenizing the object placement information and the query sentence information into tokens, and (ii) inserting a division token indicating a boundary between the tokens of the object placement information and the tokens of the query sentence information; and (4) predict a response sentence to the query sentence information by inputting the combined token sequence to an object placement characteristics database comprising a neural network, the object placement characteristics database storing object placement characteristics representing positional relations of a plurality of objects.

2. The information processing apparatus according to claim 1, wherein the one or more processors further execute the stored instructions to acquire the object placement information as first object placement information, wherein the positional relation of objects included in the query sentence information is second object placement information, and wherein the one or more processors further execute the stored instructions to predict a response sentence to the query sentence information on the basis of the first object placement information and the second object placement information using the object placement characteristics database.

3. The information processing apparatus according to claim 2, wherein the one or more processors further execute the stored instructions to predict a response sentence to a degree of similarity of the first object placement information and the second object placement information.

4. The information processing apparatus according to claim 2, wherein the one or more processors further execute the stored instructions to (1) generate third object placement information relating to the query sentence information not included in the second object placement information using the object placement characteristics database and (2) predict a response sentence to the query sentence information on the basis of a degree of similarity of the first object placement information, the second object placement information, and the third object placement information.

5. The information processing apparatus according to claim 2, wherein the first object placement information further includes first time-series information formed from time-series positional relation information of objects, and wherein the one or more processors further the stored instructions to (1) generate second time-series information formed from time-series positional relation information of objects included in the query sentence information in association with the second object placement information using the object placement characteristics database and (2) predict a response sentence to the query sentence information on the basis of a degree of similarity of the first and the second object placement information and a degree of similarity of the first and second time-series information.

6. The information processing apparatus according to claim 2, wherein the one or more processors further execute the stored instructions to store a plurality of pieces of query sentence information, and wherein the second object placement information is the positional relation of objects included in the plurality of pieces of query sentence information that are stored.

7. The information processing apparatus according to claim 2, wherein the one or more processors further execute the stored instructions to (1) extract insufficient information not included in the query sentence information using the object placement characteristics database and (2) predict a response sentence requesting the query sentence information supplementing the insufficient information.

8. The information processing apparatus according to claim 7, wherein the one or more processors further execute the stored instructions to (1) generate a degree of reliability of a response sentence to the query sentence information in association with the response sentence and (2) predict a response sentence requesting the query sentence information supplementing the second object placement information to supplement the insufficient information not included in the query sentence information when the degree of reliability is lower than a predetermined value.

9. The information processing apparatus according to claim 1, wherein the object placement information is sentence information representing the types of objects and the positional relation of objects generated on the basis of measurement information acquired by measuring the real-world space as a sentence.

10. The information processing apparatus according to claim 1, wherein the object placement characteristics database is a neural network that interprets natural language, which has been learned to (1) acquire sentence information representing the types and the positional relation of objects generated on the basis of measurement information acquired by measuring the real-world space as a sentence and (2) query sentence information acquired by inputting a query from a user as query sentence information using a sentence and output a response sentence relating to the positional relation.

11. A method for an information processing apparatus, the method comprising:

acquiring object placement information including (a) types of two or more objects and (b) positional relation information representing a three-dimensional positional relation between at least two of the objects in a real-world coordinate system, wherein the positional relation information includes at least one of: (i) a three-dimensional relative position between the objects, and (ii) a three-dimensional direction in which one of the objects is positioned relative to another of the objects, and wherein the object placement information is generated on the basis of measurement information acquired by measuring a real-world space;

receiving, from a user, query sentence information;

generating a combined token sequence by: (i) tokenizing the object placement information and the query sentence information into tokens, and (ii) inserting a division token indicating a boundary between the tokens of the object placement information and the tokens of the query sentence information; and predicting a response sentence to the query sentence information using by inputting the combined token sequence to an object placement characteristics database comprising a neural network, the object placement characteristics database storing object placement characteristics representing positional relations of a plurality of objects.

12. A non-transitory storage medium storing a control program of an information processing apparatus causing a computer to perform each step of a method of the information processing apparatus, the method comprising:

acquiring object placement information including (a) types of two or more objects and (b) positional relation information representing a three-dimensional positional relation between at least two of the objects in a real-world coordinate system, wherein the positional relation information includes at least one of: (i) a three-dimensional relative position between the objects, and (ii) a three-dimensional direction in which one of the objects is positioned relative to another of the objects, and wherein the object placement information is generated on the basis of measurement information acquired by measuring a real-world space;

receiving, from a user, query sentence information;

generating a combined token sequence by: (i) tokenizing the object placement information and the query sentence information into tokens, and (ii) inserting a division token indicating a boundary between the tokens of the object placement information and the tokens of the query sentence information; and predicting a response sentence to the query sentence information by inputting the combined token sequence to an object placement characteristics database comprising a neural network, the object placement characteristics database storing object placement characteristics representing positional relations of a plurality of objects.

* * * * *